United States Patent [19]

Spitz

[11] Patent Number: 4,719,546
[45] Date of Patent: Jan. 12, 1988

[54] FLUORESCENT LIGHTING APPARATUS

[76] Inventor: Russell W. Spitz, P.O. Box 287, Mineral Ridge, Ohio 44440

[21] Appl. No.: 865,411

[22] Filed: May 21, 1986

[51] Int. Cl.⁴ .............................................. F21V 7/02
[52] U.S. Cl. .................................... 362/260; 362/240; 362/241
[58] Field of Search ............... 362/260, 240, 241, 217, 362/220, 341, 346, 349

[56] References Cited

U.S. PATENT DOCUMENTS

| | | | |
|---|---|---|---|
| 3,159,352 | 12/1964 | Wakefield et al. | 362/227 |
| 3,829,677 | 8/1974 | DeLlano | 362/227 |
| 4,242,725 | 12/1980 | Douma et al. | 362/341 |
| 4,336,576 | 6/1982 | Crabtree | 362/240 |
| 4,388,675 | 6/1983 | Lewin | 362/225 |
| 4,403,275 | 9/1983 | Oser | 362/220 |
| 4,499,529 | 2/1985 | Figueroa | 362/283 |
| 4,536,830 | 8/1985 | Wisniewski | 362/223 |
| 4,564,888 | 1/1986 | Lewin et al. | 362/147 |

Primary Examiner—Raymond A. Nelli
Attorney, Agent, or Firm—Harpman & Harpman

[57] ABSTRACT

Fluorescent lighting apparatus utilizing a single elongated fluorescent tubular light source replaces the multiple fluorescent tubular light sources of conventional or prior art fluorescent lighting apparatus. A substantial savings in energy consumption and cost of replacement fluorescent tubular light source units results. A substantial part of the light output of the fluorescent tubular light source is reflected by an improved reflector construction having multiple elongated strip-like mirror surfaces formed of a film base having a silver coating, the mirror surfaces being arranged to direct the reflected light of the single fluorescent tubular light source over a relatively wide area whereby it appears that a greater number of fluorescent tubular light sources are provided.

11 Claims, 8 Drawing Figures

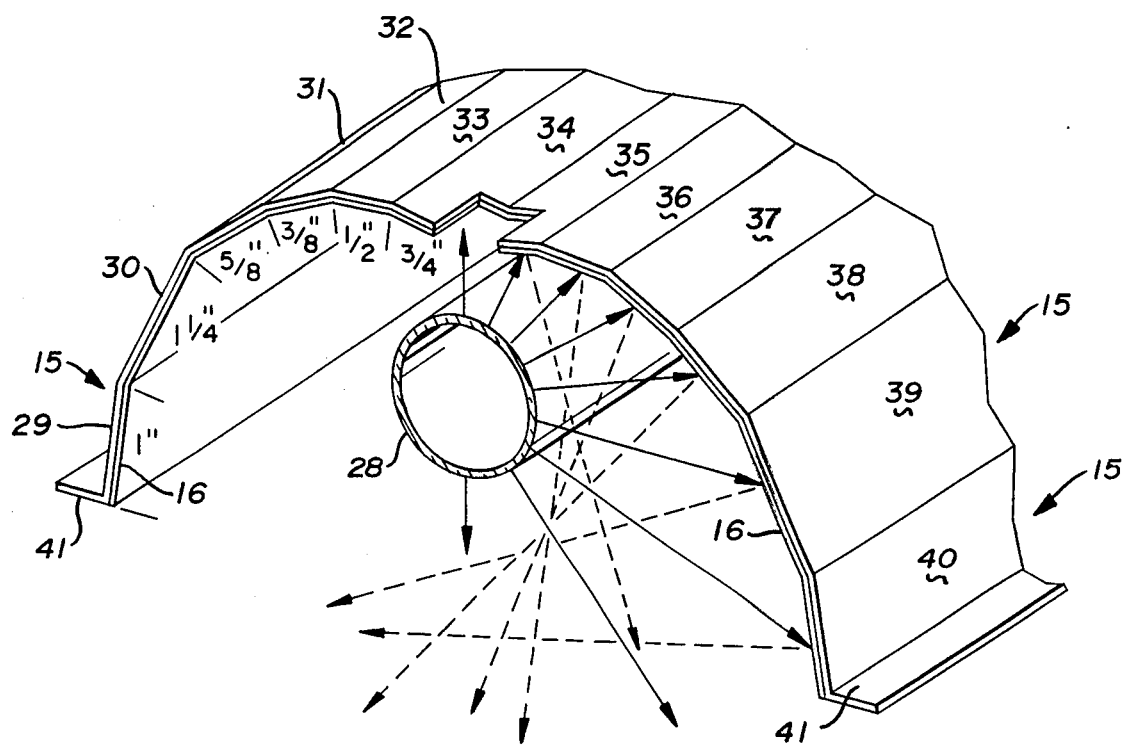
FIG. 6
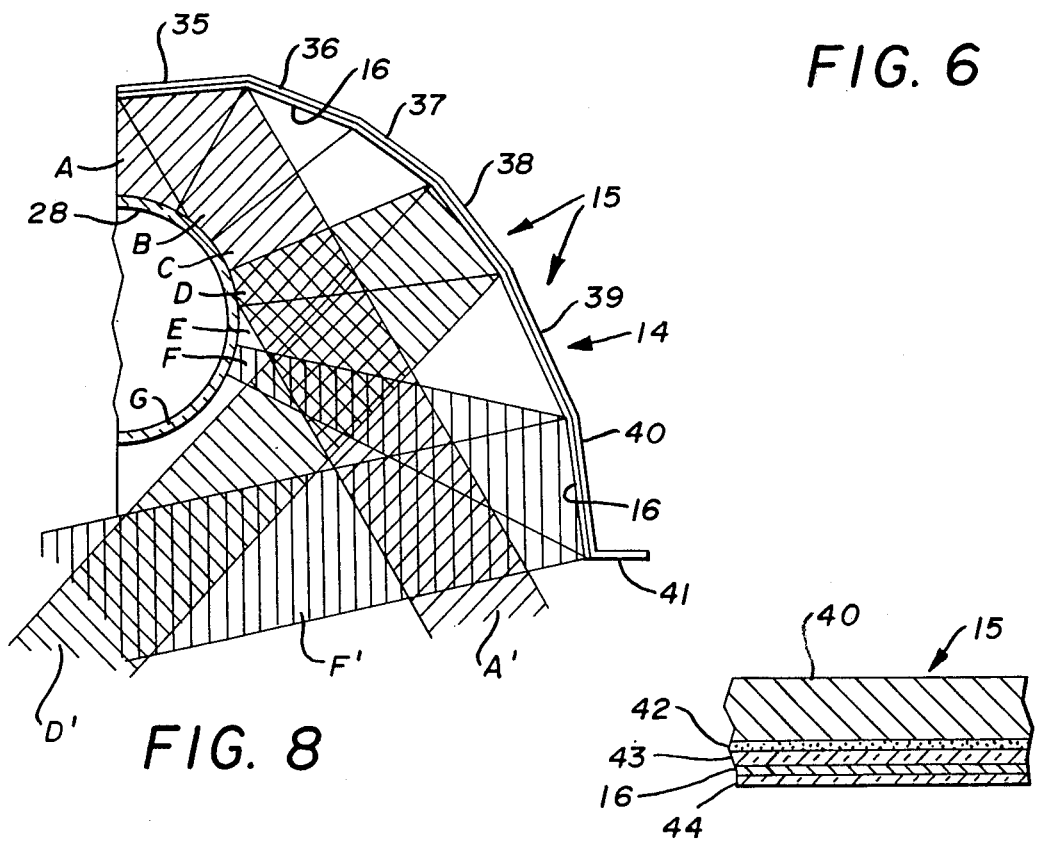
FIG. 8
FIG. 7

FLUORESCENT LIGHTING APPARATUS

BACKGROUND OF THE INVENTION

1. Technical Field

This invention relates to fluorescent lighting apparatus of the type utilizing elongated fluorescent tubes in or on fixtures mounted on the ceiling of an enclosure to be illuminated thereby.

2. Description of the Prior Art

Prior fluorescent lighting apparatus, such as used in commercial applications, including retail stores and the like, have generally utilized two or more fluorescent tubes positioned in side-by-side relation on or in a fixture usually having a white painted reflective surface, the fixture being mounted flush on the ceiling of the commercial structure with the fluorescent tubes exposed to insure the delivery of as much light as possible downwardly therefrom. A typical prior art liminaire is disclosed in U.S. Pat. No. 3,159,352 wherein an improved refractor is positioned below the fluorescent tubes for improving the distribution of the light output therefrom. U.S. Pat. No. 3,829,677 also illustrates a multiple tube fluorescent fixture and discloses the use of reflectors taking the form of elongated shells of parabolic cross section. Various patents relating to reflectors for fluorescent tube light sources may be seen in U.S. Pat. Nos. 4,242,725, 4,388,675 and 4,499,529. U.S. Pat. No. 4,336,576 discloses an improved reflector means whereby the light from one of a pair of fluorescent light tubes is directed toward a diffusion plate with the object of increasing the light delivered to the diffusion plate sufficiently that one of the two fluorescent tubes can be eliminated. Similar improved light reflectors for fluorescent tube fixtures in which one or more of the original fluorescent tubes may be removed may be seen in U.S. Pat. Nos. 4,403,275, 4,536,830 and 4,564,888. The present invention substantially improves the light delivery of a fluorescent tube light source by utilizing a reflector having mirror reflective surfaces with several reflective surfaces arranged to direct the reflected light in a substantially wide overall pattern that has the visual appearance of a wide light source rather than the narrow tubular source.

SUMMARY OF THE INVENTION

The fluorescent lighting apparatus disclosed herein positions an elongated fluorescent tube in a reflector having a plurality of elongated transversely flat silver light reflecting surfaces arranged in edge-to-edge relation with one another and generally positioned in a widened arcuate shape wherein the silver reflecting surfaces are of progressively increasing transverse width from points closest the fluorescent tube to points furthest from the fluorescent tube whereby the direct light from the fluorescent tube and the reflected light from the silver reflective surfaces are distributed equally outwardly of the full width of the fluorescent lighting fixture.

DESCRIPTION OF THE DRAWING

FIG. 6 is a perspective view of an end of fluorescent lighting apparatus illustrating the configuration of the reflector; arrows indicate the direction of light toward and away from the several mirror reflective surfaces;

FIG. 7 is a substantially enlarged cross sectional elevation of a portion of the reflector embodying the present invention and illustrating the supporting structure of the reflector and the mirror reflecting surface as a silver coating in a flexible film base adhesively attached to the reflector structure; and FIG. 8 is an enlarged end elevation of one half of the fluorescent lighting apparatus of the present invention with shaded areas representing light directed toward some of the reflective surfaces and light reflected downwardly and outwardly therefrom.

DESCRIPTION OF THE PREFERRED EMBODIMENT

Figure 1:
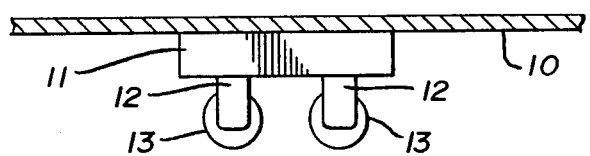
FIG. 1 is an end elevation of a conventional fluorescent lighting fixture on a supporting ceiling surface.

By referring to the drawing and FIG. 1 in particular, a typical prior art fluorescent lighting fixture such as used in commercial installations may be seen affixed to a ceiling surface 10, the fixture comprising a metal housing 11 in which the usual ballast, not shown, is positioned and a pair of lamp holders 12 adjacent one end of the metal housing 11 which with a similar pair of lamp holders on the other end of the metal housing 11 support and energize a pair of fluorescent tubes 13. The metal housing 11 is usually painted white in an effort to reflect some of the light from the fluorescent tubes downwardly and away from the fixture.

Figure 2:
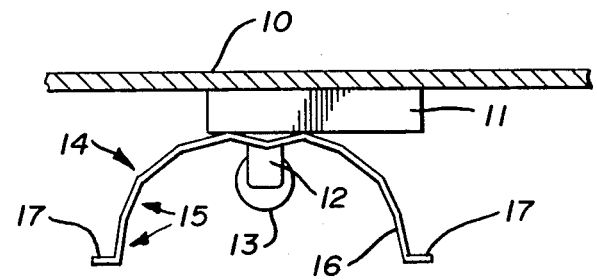
FIG. 2 is an end elevation of the fluorescent lighting apparatus embodying the present invention applied to a single fluorescent tube of a multiple fluorescent tube fixture.

In FIG. 2 of the drawings, the ceiling surface 10 is illustrated along with the metal housing 11 and one of the lamp holders 12 together with one fluorescent tube 13 which is held at both ends by lamp holders 12 as will be understood by those skilled in the art. In FIG. 2 of the drawings a reflector structure 14 of a modified arcuate shape is illustrated symbolically as having a plurality of longitudinally extending transversely flat light reflective portions 15 positioned radially of said fluorescent tube 13 so as to partially surround the same.

Figure 3:
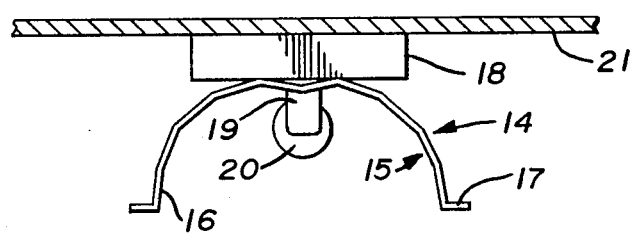
FIG. 3 is an end elevation of the fluorescent lighting apparatus embodying the present invention applied to a single fluorescent tube fixture.

The several light reflective portions 15 are arranged in edge-to-edge relation and in the preferred embodiment of the invention there are 12 such longitudinally extending transversely flat light reflecting portions 15, each of which has a silver light reflecting mirror 16 thereon; still referring to FIG. 2 of the drawings it will be seen that the outer opposite ends of the reflector structure 14 form out-turned flanges 17. The same embodiment of the invention incorporating the reflector structure 14 with its plurality of light reflecting portions 15 and their mirror surfaces 16 may be seen in FIG. 3 of the drawings where a conventional single tube fluorescent fixture comprising a metal housing 18 and a pair of lamp holders 19 mount a single fluorescent tube 20. The metal housing 18 being attached to a ceiling surface 21.

Figure 4:
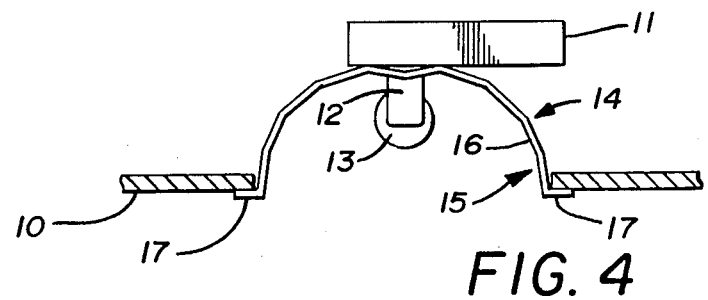
FIG. 4 is an end elevation of the fluorescent lighting apparatus embodying the present invention applied to a single fluorescent tube of a multi-tube fluorescent fixture positioned above an opening in a ceiling.
Figure 5:
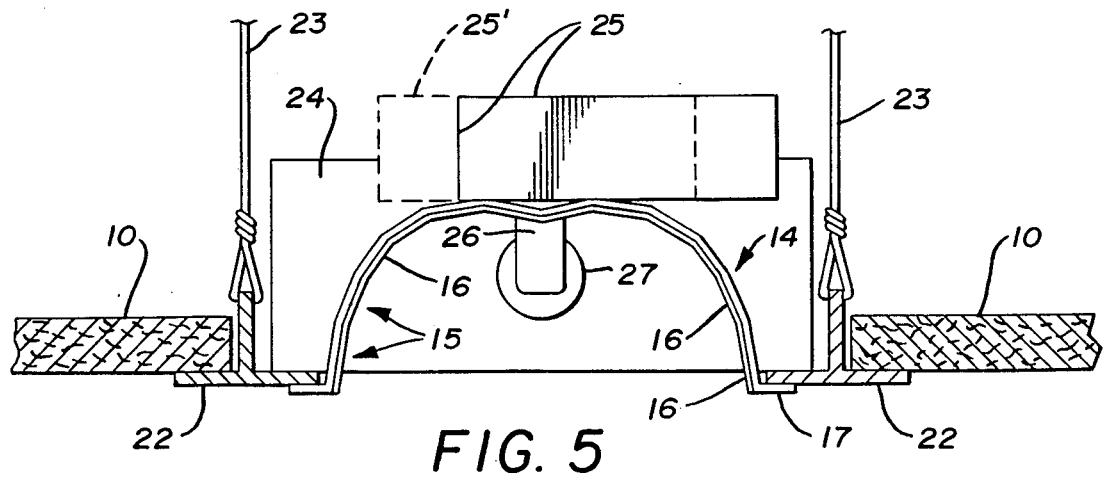
FIG. 5 is an enlarged cross sectional elevation of a fluorescent lighting apparatus embodying the present invention supported on hangers in an opening in a ceiling with broken lines showing a single fluorescent tube fixture and solid lines showing a multi-tube fluorescent fixture.

In FIG. 4 of the drawings the present invention comprising the combination of the reflector structure 14 with the lighting fixture comprising the metal housing 11 having a pair of lamp holders 12 mounting a single fluorescent tube 13 may be seen positioned above an opening in a ceiling surface 10 with the out-turned flanges 17 engaged beneath the edges of the ceiling 10 defining the opening therein. Those skilled in the art will understand that additional supports not shown are preferably employed to support the metal housing 11, the fluorescent tube 13 and the reflector structure 14. Such an arrangement may be seen in end elevation in FIG. 5 of the drawings wherein the ceiling 10 defines an opening in which inverted T-shaped hangers 22 are positioned and supported by upwardly extending support wires 23 so as to form a frame in the opening in the ceiling. Support brackets 24 resting on the hangers 22 carry a metal housing 25 as illustrated in solid lines from which a pair of lamp hangers 26 depend so as to support a fluorescent tube 27. It will be seen that a pair of the usual second lamp hangers and a second fluorescent tube have been removed and the invention incorporating the reflector structure 14 having the plurality of light reflecting portions 15 and their planar mirror reflecting surfaces 16 is shown attached to the metal housing 25 and thereby supported in the opening in the ceiling 10, the out-turned flanges 17 of the reflector structure 14 underlying portions of the frame defined by the hangers 22.

While several possible combinations of the present invention with a conventional double tube or single tube fluorescent fixture mounted on a ceiling or above a ceiling in an opening therein have been illustrated. It will occur to those skilled in the art that the reflector structure 14 illustrated in such combinations may be advantageously employed in other fluorescent tube fixtures having similar or dissimilar structures when compared with those illustrated herein and hereinbefore described.

The precise and highly effective light reflecting structure useful in combination with a fluorescent fixture having at least one fluorescent tube therein is illustrated in FIG. 6 of the drawings which illustrates an end section of a fluorescent tube 28 as a single light source positioned in radially spaced relation to and in the central upper half of a modified arcuately shaped reflector structure 14 having twelve longitudinally extending transversely flat portions 29-40 inclusive and out-turned longitudinally extending continuous flanges 41 attached to the lower longitudinal edges of the longitudinally extending transversely flat portions 29 and 40 respectively. The inner sides of the longitudinally extending transversely flat portions 29-40 inclusive carry a silver mirror reflecting coating 16 carried in a plastic film which is manufactured and sold by Deposition Technology, Inc. of San Diego, Calif. Tests conducted with reflectors using the Deposition Technology, Inc. material demonstrate that 95% of the light from a fluorescent tube is reflected by the material as compared with between 60% and 85% of light reflected by an anodized polished aluminum reflector and only 5% of light reflected by a white painted reflector. The planar mirrors are positioned on parallel arcuately angularly disposed segments of the reflector structure 14. The effectiveness of the silver light reflecting material used in the present invention is greatly enhanced by the particular size, positioning and arrangement of the twelve light reflecting portions 29-40 inclusive of the reflector structure 14. Still referring to FIG. 6 of the drawings and the left portion thereof, it will be seen that the longitudinally extending transversely flat portion 29 has a transverse width of 1 inch, the adjacent portion 30 has a transverse width of 1¼ inches, the adjacent portion 31 has a transverse width of ⅝ of an inch, the portion 32 has a transverse width of ⅝ of an inch, the portion 33 has a transverse width of ½ inch and the portion 34 has a transverse width of ¾ inch. The right half portion of the reflector structure 14 illustrated in FIG. 6 has duplicate matching oppositely disposed portions of the same widths, for example the portion 40 having a transverse width of 1 inch et cetera. Each pair of the oppositely disposed matching portions (for example 29 and 40) are spaced equally with respect to the fluorescent tube 28 and all of said pairs of oppositely disposed matching portions are spaced from the fluorescent tube 28 by different lengths. Still referring to FIG. 6 of the drawings, solid line arrows extend from the surface of the fluorescent tube 28 and indicate some of the direct light rays therefrom striking some of the several longitudinally extending transversely flat portions 35 through 40 respectively, while broken line arrows indicate the generally direction of the reflected light from these same portions and it will be seen that the angular arrangement of the portions 35 through 40 is such that the reflected light is directed substantially downwardly and outwardly through the open bottom of the reflector structure 14, it being understood that the light from the left half of the reflector structure 14 is reflected in a mirror-image pattern of the light rays indicated by the solid arrows and their reflected broken arrow directions. The result of the reflector structure 14 and its multiplicity of longitudinally extending transversely flat light reflecting portions is such that when the single fluorescent tube 28 is illuminated the reflected light and the direct light when viewed from below the embodiment of the present invention appears to be a flat wide light source having a width equal to the width of the open portion of the reflector structure 14 rather than the the single narrow light source that has heretofore been associated with a fluorescent tube fixture. In commercial applications the present invention enables half of the fluorescent tubes in a commercial lighting installation to be removed with the light level originating in the improved flouurescent lighting apparatus substantially equal the light level of the original installation while resulting in a 50% savings in energy costs and a substantial additional savings representing the replacement costs originally incurred with the dual flourescent tube installations. By referring again to FIG. 5 of the drawing it will be seen that the solid line representation of the metal housing 25 is that of a two tube commercial flouurescent lighting fixture with one of the original fluorescent tubes and its lamp holders removed and that broken lines represent a metal housing of a single flourescent tube fixture, the figure demonstating the adaptability of the reflector structure 14 as applied to one remaining tube of a two tube fluorescent fixture or to the single fluorescent tube of a single tube fluorescent fixture. In adding the present invention to a conventional single tube fluorescent fixture, the light output of the same is approximately doubled, which permits the removal of some of the original single tube fixtures while maintaining the original light level.

The substantially doubled light level obtained from a fluorescent tube in combination with the reflector structure of the present invention and the spreading out of the light rays by the configuration of the reflector structure 14 and the plurality of longitudinally extending transversely flat portions 29 through 40 thereof with their silver mirror reflecting coating 16 is symbolically illustrated in FIG. 8 of the drawing wherein a half portion of the reflector structure 14 is illustrated in cross-section along with a half portion of the fluorescent tube 28 and wherein light rays A from a portion of the fluorescent tube 28 are illustrated symbolically by diagonal shading reaching the portion 35 of the reflector structure 14 and most of the light rays reflected from the portion 35 are illustrated in the same diagonal shading at A', the angle from the plane of the portion 35 of the reflector structure 14 being approximately 65°. The light rays from a spaced portion of the fluorescent tube 28 are indicated by D and illustrated as oppositely angled diagonal shading, the light rays D engaging the portion 38 of the reflector structure 14 and being reflected therefrom are indicated by the same diagonal shading indicated at D', it being observed that the reflected light rays are at an angle of about 80 degrees from the plane of the portion of 38 of the reflector structure 14. A third showing of light rays F indicated by vertical shading as emanating from the fluorescent tube 28 are illustrated as being reflected at F' by the mirror reflective surface 16 of the portion 40 of the reflector structure 14. It will be understood that the left half of the reflector structure and fluorescent tube 28, not shown in FIG. 8 are substantial mirror images of the right half illustrated and described herein and it will thus be seen that the shape, size and positioning of the portions 29 through 40 inclusive or the reflector structure 14 with their silver mirror reflective lining 16 act to distribute reflected light in equal amounts out of the open bottom of the reflector structure 14 which reflected light along with the direct light from the fluorescent tube 28 form a wide light source when viewed rather than the single narrow light source heretofore emanating from a conventional fluorescent tube lighting fixture and thereby eliminate the need of a diffusion plate as heretofore used with some fluorescent fixtures to eliminate the bright narrow visual impression of the light source and it will be understood by those skilled in the art that the elimination of the diffusion plates results in more of the light being deliverd from the light fixture. By referring now to FIG. 7 of the drawing a very greatly enlarged section of the longitudinally extending transversely flat portion 40 of the reflector structure 14 may be seen with the silver mirror reflective material 16 applied thereto by an adhesive 42 which is provided on one surface of a film base 43, the other surface thereof carrying the silver coat 16 which is protected from oxidation by a clear top coat 44.

The various forms of the fluorescent lighting apparatus employing the principals of the invention serve to improve lighting efficiency and to improve energy economy. The invention provides a most efficient and economical means of modifying existing fluorescent fixtures through the elimination of half of the tubes on multiple tube fixtures or doubling the efficiency of single tube fixtures. While preferred embodiments of the apparatus according to the invention have been described and shown in the drawings, many modifications thereof may be made by a person skilled in the art without departing from the spirit of the invention and it is intended to protect by letters patent all forms of the invention falling within the scope of the following claims.

I claim:
1. In fluorescent lighting apparatus of the type having several fluorescent tubes and elongated structures supporting the same wherein conveniently at least two of the fluorescent tubes are disposed on each of said structures, an improved fluorescent lighting apparatus formed by eliminating at least one fluorescent tube from each of said structures without altering the position of the remaining fluorescent tube, the improvement comprising: an elongated reflector means formed of a plurality of elongated planar mirrors arranged in a modified arcuate configuration positioned radially of and partially surrounding said remaining fluorescent tube so that said remaining fluorescent tube is centrally positioned with respect to said reflector means and so that the longitudinaly axis of said remaining fluorescent tube is substantially in the upper half of said elongated downward facing opening of a known width, spaced in the lower half of said elongated reflector means substantially below said remaining fluorescent tube, said elongated planar mirrors being angularly disposed to reflect light from said remaining fluorescent tube in a direction away from said remaining fluorescent tube and outwardly and downwardly through said downward facing opening, whereby said reflected light is distributed in substantially equal amounts across the width of said opening and whereby said fluorescent light apparatus appears to have a light source of a width equal to the known width of said downward facing opening.

2. The improvement in fluorescent lighting apparatus set forth in claim 1, said plurality of elongated planar mirrors comprising parallel angularly disposed flat reflective segments of said elongated reflector means in said arcuate configuration.

3. The improvement in fluorescent lighting apparatus set forth in claim 1 wherein said plurality of elongated planar mirrors have reflective surfaces of high reflective efficiency.

4. The improvement in fluorescent lighting apparatus set forth in claim 1, wherein said elongated planar mirrors comprise parallel arcuately angularly disposed flat reflective segments of a continuous reflector body means.

5. The improvement in a fluorescent lighting apparatus set forth in claim 1, wherein said elongated reflector means is an integral body member supporting said plurality of elongated planar mirrors.

6. The improvement in fluorescent lighting apparatus set forth in claim 1 and wherein said elongated reflector means is an integral body member comprising a segmented curved structure having parallel flat surfaces carrying said elongated planar mirrors.

7. The improvement in fluorescent lighting apparatus set forth in claim 6 and wherein said parallel flat surfaces are arranged in oppositely disposed pairs in said segmented curved structure.

8. The improvement in fluorescent lighting apparatus set forth in claim 7 and wherein said parallel flat surfaces are arranged in oppositely disposed pairs in said segmented curved structure, the flat surfaces of each of said oppositely disposed pairs being of different transverse widths.

9. The improvement in fluorescent lighting apparatus set forth in claim 1 and wherein said elongated reflector means comprises an integral body member formed in a series of mutually angular parallel flat strips disposed in arched dispositions.

10. The improvement in fluorescent lighting apparatus set forth in claim 1 wherein each of said elongated planar mirrors reflects several mirror images of said fluorescent tube at a location spaced from said fluorescent tube to create the effect of several fluorescent tubes in said apparatus.

11. In fluorescent lighting apparatus of the type having two fluorescent tubes and a single elongated structure supporting the same in spaced relation therebelow, an improved fluorescent lighting apparatus formed by eliminating one of said fluorescent tubes from said structure without altering the position of the remaining fluorescent tube, the improvement comprising: an elongated reflector means comprising an integral segmented curved structure having oppositely disposed parallel flat surfaces on said supporting structure forming pairs in spaced relation to said fluorescent tube, said fluorescent tube being midway between each of said parallel flat surfaces forming said pairs, said parallel flat surfaces facing said fluorescent tube and having light reflecting means disposed thereon, said parallel flat surfaces and said light reflecting means being dimensioned and angularly positioned to reflect light away from said fluorescent tube and outwardly of said elongated reflector means towards a downward facing reflector opening, whereby said fluorescent light apparatus directs reflected light in equal amounts across said reflector opening to locations spaced from said fluorescent tube to create illumination at said locations, and whereby said lighting apparatus appears to have a light source of a width equal to the width of the reflector opening.

* * * * *

UNITED STATES PATENT AND TRADEMARK OFFICE
CERTIFICATE OF CORRECTION

PATENT NO. : 4,719,546
DATED : Jan. 12, 1988
INVENTOR(S) : Russell W. Spitz

Page 1 of 2

It is certified that error appears in the above-identified patent and that said Letters Patent is hereby corrected as shown below:

IN THE BACKGROUND OF THE INVENTION

In column 1, line 19, under subsection "2. Description of the Prior Art", please delete "liminaire" and substitute therefor --luminaire--.

IN THE DESCRITPION OF
THE PREFERRED EMBODIMENT

In column 4, lines 23-24, please delete "generaly" and substitute therefor --general--;

In column 4, line 57, please delete "demonstating" and substitute therefor --demonstrating--;

In column 5, line 32, please delete "or the reflector" and substitute therefor --of the reflector--;

IN THE CLAIMS

In Claim 1 (column 6, line 4), please delete "conveniently" and substitute therefor --conventionally--;

In Claim 1 (column 6, line 16), please delete "longitudinaly" and substitute therefor --longitudinal--;

UNITED STATES PATENT AND TRADEMARK OFFICE
CERTIFICATE OF CORRECTION

PATENT NO. : 4,719,546

DATED : Jan. 12, 1988

INVENTOR(S) : Russell W. Spitz

It is certified that error appears in the above-identified patent and that said Letters Patent is hereby corrected as shown below:

In Claim 1 (column 6, line 17), after the word "elongated" please add the following:

--reflector means, said reflector means defining an elongated--.

Signed and Sealed this

Twenty-sixth Day of July, 1988

Attest:

DONALD J. QUIGG

Attesting Officer

Commissioner of Patents and Trademarks